Nov. 8, 1960 F. D. JONES 2,959,272
CONVEYOR WITH RETRACTIBLE LUGS
Filed Oct. 13, 1958

INVENTOR.
F. D. JONES

United States Patent Office 2,959,272
Patented Nov. 8, 1960

2,959,272

CONVEYOR WITH RETRACTIBLE LUGS

Frank D. Jones, Moline, Ill., assignor to Deere & Company, Moline, Ill., a corporation of Delaware Filed Oct. 13, 1958, Ser. No. 766,806

2 Claims. (Cl. 198—170)

This invention relates to a conveyor means and more particularly to an improved conveyor of the type having retractable lugs or equivalent material-engaging members.

The invention finds particular utility in agricultural machinery, wherein the retractable feature of the lugs is exploited to facilitate conveyor design and to afford a conveyor system in which clogging of material is avoided, inasmuch as the lugs can retract as they pass through openings adjacent to a crop-receiving passageway. It is a significant feature of the invention to provide a retractable-lug conveyor in which the lug-retracting means operates solely as a function of the links and is not dependent upon structure apart from the links, thus enabling the use of a simpler and less expensive design.

The foregoing and other important objects and desirable features inherent in and encompassed by the invention will become apparent as a preferred embodiment thereof is disclosed by way of example in the ensuing description and accompanying drawing, the several figures of which are described below.

Figure 1:
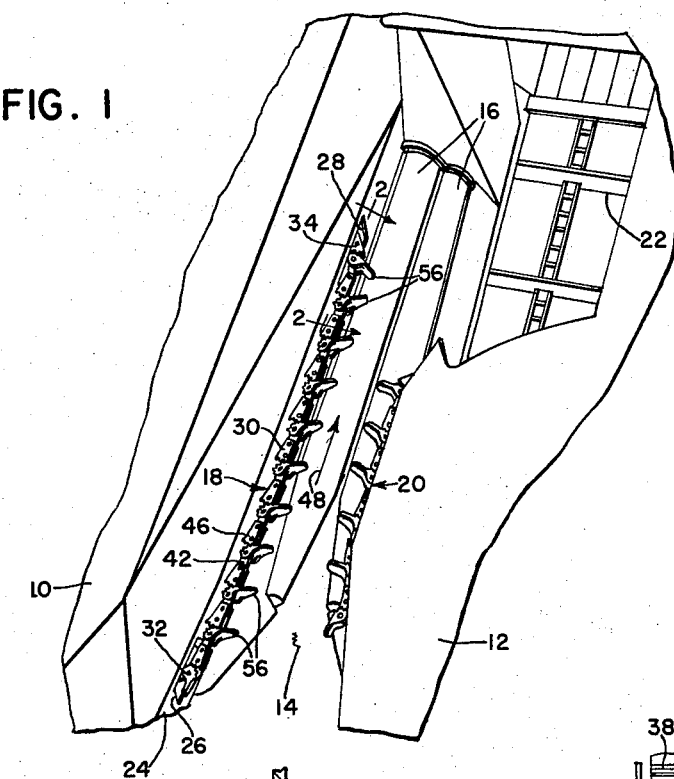
Fig. 1 is a fragmentary perspective of the gathering mechanism of a typical corn harvester.

The invention is illustrated as employed in the gathering mechanism of a corn harvester, and the representative structure chosen for purposes of illustration typically includes a pair of fore-and-aft elongated wall elements 10 and 12, known in the corn harvester art as gatherer sheets. These define between them an elongated relatively narrow crop-receiving passageway 14 in which a pair of rotatable snapping rolls 16 operate to remove ears from standing stalks received as the machine advances. Because of the environmental structure, such expressions as "front," "rear" etc., will be employed in the interests of clarity. It will be understood, however, that these are mere words of convenience and not of limitation.

The entry of stalks to the passageway 14 for treatment by the snapping rolls 16 is conventionally facilitated by inner and outer gatherer chains or conveyors, here designated respectively at 18 and 20. These may be alike except for length, and consequently further description will be devoted to the chain 18. As the ears are snapped from the stalks by the snapping rolls 16, they are caused to move laterally for elevation by what is known as a first elevator or side conveyor 22.

Figure 2:
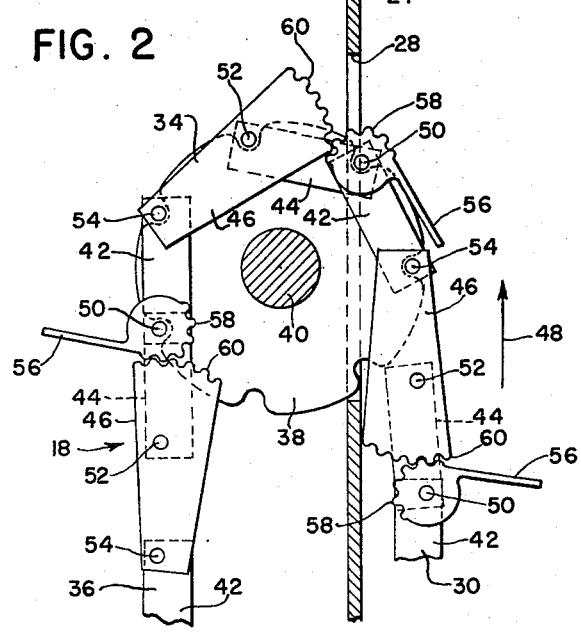
Fig. 2 is an enlarged section as seen generally on the line 2—2 of Fig. 1.
Figure 3:
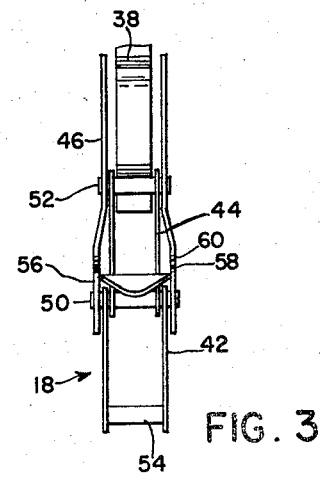
Fig. 3 is a fragmentary elevation of the conveyor chain.

An upright portion 24 of the element 10 has therein front and rear openings 26 and 28, and the chain 18 is made up of a plurality of pivotally interconnected links—to be described in detail later-establishing for the conveyor a rearwardly moving operative run 30, a front loop 32, a rear loop 34 and a forwardly moving return run 36 (Fig. 2). The rear loop 34 is trained about a rotary part, here in the form of a sprocket 38 carried by a shaft 40 whose axis is normal to the general plane of the conveyor.

The links in the conveyor chain may be considered as sets, each set including three links, numbered for clarity as 42, 44 and 46. The direction of rearward movement of the operative run 30 is represented by the arrow 48.

The link 42 is pivotally connected at one end by a pivot 50 to the adjacent end of the next link 44, and the link 44 is pivotally connected at 52 to an intermediate portion of the next link 46. The link 46 is pivotally connected at 54 to the link 42 of the next adjacent set. The arrangement is such that the links are strung out to afford the operative run 30 when the conveyor moves. The pivots between the links enable the links to have relative angular movement as the links turn the corner at the upper or lower, or rear and front, loops, it being understood that the links at the upper loop turn the corner as they pass around the upper sprocket 38 and it being further understood that a similar sprocket will be provided to support the lower loop 32.

The conveyor carries a plurality of crop-engaging means, here in the nature of a plurality of lugs 56. Each lug is mounted coaxially at the pivot 50 and has a gear tooth portion 58 thereon, which is in constant mesh with a cooperative gear tooth portion 60 on the next adjacent link 46. Since the link 46 is pivoted to the link 44 intermediate its ends at 52, the portion of the link beyond the pivot 52 may be considered a rigid extension of the link.

The arrangement is such that the links 46 stand out or extend laterally from the operative run 30 as this run moves along the passageway 14 from front to rear. Tension in the links keep the links aligned chain fashion, so that the positive engagement of the cooperative gear teeth 58—60 maintains the extended or laterally projecting position of the lugs. As the lugs reach the upper loop 34, relative angular movement between the links 42, 44 and 46 of a set causes the lugs 56 to be successively retracted as the conveyor turns the corner.

One advantage in this arrangement is that the retracted lugs more easily pass through the opening 28, it being noted that the lateral extent of the projected lugs is greater than the clearance between the sprocket 38 and the wall portions defining the opening 28. Another advantage is that the lugs, retracting, do not tend to carry material through the opening 28, and thus clogging by carry-over of crop or other material is avoided.

Since the extension and retraction of the lugs depends entirely upon association of the lugs with the links and not with allied parts of the supporting structure, such as cams, guides, etc., prevalent in the prior art, the conveyor is of simple and inexpensive construction. Features other than those enumerated will readily occur to those versed in the art, as will modifications and alterations in the preferred embodiment disclosed, all of which may be achieved without departure from the spirit and scope of the invention.

What is claimed is:

1. A conveyor comprising: a series of links interconnected by a plurality of parallel pivots to afford a generally straight run along which the links are strung out chain fashion as the conveyor moves and said pivots enabling neighboring links to have relative angular movement when the conveyor turns a corner; a material-engaging member movable with the conveyor; means mounting said member coaxially with the pivot between one link and its next adjacent link for swinging movement relative to the links between two positions, said member having gear teeth thereon concentric with said pivot; and a rigid extension on the link next beyond said next adjacent link and having gear teeth thereon meshing with the member gear teeth for incurring one position of the member as said links are strung out and for incurring the other position of said member as said links move relatively when the conveyor turns a corner.

2. A conveyor comprising: a series of links interconnected by a plurality of parallel pivots to afford a generally straight run along which the links are strung out chain fashion as the conveyor moves and said pivots enabling neighboring links to have relative angular movement when the conveyor turns a corner; a material-engaging member movable with the conveyor; means mounting said member on one link for movement relative to said one link between two different positions; and intermeshing gears on said member and another link respectively for incurring one position of the member as said links are strung out and for incurring the other position of said member as said one link and said other link move relatively when the conveyor turns a corner.

References Cited in the file of this patent
UNITED STATES PATENTS

| | | |
|---|---|---|
| 2,113,733 | Kraft | Apr. 12, 1938 |
| 2,267,549 | Bronander | Dec. 23, 1941 |
| 2,341,977 | Corbin | Feb. 15, 1944 |